(12) United States Patent
Wu et al.

(10) Patent No.: US 11,647,151 B2
(45) Date of Patent: May 9, 2023

(54) VIDEO TIMING CONVERSION METHOD AND DEVICE, AND COMPUTER READABLE MEDIUM

(71) Applicant: BOE TECHNOLOGY GROUP CO., LTD., Beijing (CN)

(72) Inventors: Congrui Wu, Beijing (CN); Lihua Geng, Beijing (CN); Xitong Ma, Beijing (CN); Yanfu Li, Beijing (CN); Tianmin Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/614,346

(22) PCT Filed: Jan. 13, 2021

(86) PCT No.: PCT/CN2021/071450
§ 371 (c)(1),
(2) Date: Nov. 25, 2021

(87) PCT Pub. No.: WO2021/143717
PCT Pub. Date: Jul. 22, 2021

(65) Prior Publication Data
US 2022/0224859 A1 Jul. 14, 2022

(30) Foreign Application Priority Data
Jan. 17, 2020 (CN) .......................... 202010053686.6

(51) Int. Cl.
*H04N 7/01* (2006.01)
(52) U.S. Cl.
CPC ...................................... *H04N 7/01* (2013.01)
(58) Field of Classification Search
CPC .................................. H04N 7/01; H04N 5/04
(Continued)

(56) References Cited

U.S. PATENT DOCUMENTS 5,835,150 A 11/1998 Choi
7,199,834 B2 * 4/2007 Fujii ........................ H04N 5/10
348/521

(Continued)

FOREIGN PATENT DOCUMENTS

CN 101577806 A 11/2009
CN 101686399 A 3/2010
(Continued)

OTHER PUBLICATIONS

China Patent Office, First Office Action dated Nov. 29, 2021, for corresponding Chinese application No. 202010053686.6.

*Primary Examiner* — Sherrie Hsia
(74) *Attorney, Agent, or Firm* — Houtteman Law LLC (57) ABSTRACT

A video timing conversion method and a video timing conversion device, and a non-transitory computer-readable storage medium are provided. The video timing conversion method includes: analyzing an original timing signal in a form of a differential signal of an original video, to obtain original timing parameters; determining target timing parameters and a target clock signal parameter according to a format of a target video and the original timing parameters; wherein the target timing parameters include a data enabling period number, a field sync data valid row number and a refreshing frequency, which are the same as the data enabling period number, the field sync data valid row number and the refreshing frequency of the original timing parameters, respectively; generating a target timing signal in the form of the differential signal of the target video according to the target timing parameters and the target clock signal parameter.

20 Claims, 4 Drawing Sheets

(58) Field of Classification Search
USPC .............. 348/441, 500, 464, 469, 536, 537
See application file for complete search history.

(56) References Cited

U.S. PATENT DOCUMENTS

2014/0204269 A1  7/2014  Sugiyama
2017/0223307 A1  8/2017  Ono

FOREIGN PATENT DOCUMENTS

| CN | 103024430 A | 4/2013 |
| CN | 103945157 A | 7/2014 |
| CN | 107094239 A | 8/2017 |
| CN | 108965819 A | 12/2018 |

* cited by examiner

VIDEO TIMING CONVERSION METHOD AND DEVICE, AND COMPUTER READABLE MEDIUM

CROSS REFERENCE TO RELATED APPLICATIONS

The present application claims the priority of the Chinese Patent Application No. 202010053686.6 filed on Jan. 17, 2020, the content of which is incorporated herein by reference in its entirety.

TECHNICAL FIELD

The present disclosure relates to the field of display technology, and in particular to a video timing conversion method and a video timing conversion device, and a computer readable medium.

BACKGROUND

A video signal includes a timing signal, a clock signal, and an image signal.

The image signal includes image data (DATA), which is used to indicate "display contents" of each "dot" of an image. The timing signal is used to indicate how to control a display panel to display, i.e., how to write the image data to respective pixels, as a pulse period (clock period) calculated according to the clock signal advances.

SUMMARY

An embodiment of the present disclosure provides a video timing conversion method and a video timing conversion device, and a computer readable medium.

In a first aspect, an embodiment of the present disclosure provides a video timing conversion method, including steps of:

analyzing an original timing signal in a form of a differential signal of an original video, to obtain original timing parameters, wherein the original timing parameters include a data enabling period number, a field sync data valid row number and a refreshing frequency;

determining target timing parameters and a target clock signal parameter according to a format of a target video and the original timing parameters; wherein the target timing parameters include a data enabling period number, a field sync data valid row number and a refreshing frequency, which are the same as the data enabling period number, the field sync data valid row number and the refreshing frequency of the original timing parameters, respectively;

generating a target timing signal in the form of the differential signal of the target video according to the target timing parameters and the target clock signal parameter.

In some embodiments, the video timing conversion method further includes steps of:

analyzing an image signal of the original video to obtain image data;

synchronizing the image data with the target timing signal to generate the target video.

In some embodiments, the step of determining target timing parameters according to a format of a target video and the original timing parameters includes steps of:

determining the data enabling period number, the field sync data valid row number and the refreshing frequency of the target timing parameters, which have the same values as the data enabling period number, the field sync data valid row number and the refreshing frequency of the original timing parameters, respectively;

searching target timing additional parameters corresponding to the data enabling period number, the field sync data valid row number and the refreshing frequency of the target timing parameters, according to a preset correspondence in the format of the target video.

In some embodiments, the target timing additional parameters includes:

a row sync total period number, a row sync signal period number, a row sync front shoulder period number, a row sync back shoulder period number, a field sync total row number, a field sync signal period number, a field sync front shoulder row number, and a field sync back shoulder row number.

In some embodiments, the step of determining a target clock signal parameter according to a format of a target video and the original timing parameters includes:

determining a frequency of the target clock signal, which is equal to the row sync total period number× the field sync total row number×the refreshing frequency.

In some embodiments, the original timing signal is in the form of a low voltage differential signal; and the target timing signal is in the form of the low voltage differential signal.

In some embodiments, the original timing signal includes an original row sync signal, an original field sync signal, and an original data enabling signal; and the target timing signal includes a target row sync signal, a target field sync signal, and a target data enabling signal.

In some embodiments, the step of generating a target timing signal in the form of the differential signal of the target video according to the target timing parameters and the target clock signal parameter includes steps of:

generating the target clock signal according to the target clock signal parameter.

counting a pulse period of the target clock signal to obtain a counting result.

generating a target timing signal according to the target timing parameters and the counting result.

In some embodiments, the target timing parameters further includes target timing additional parameters, the target timing additional parameters including: a row sync total period number, a row sync signal period number, a row sync front shoulder period number, a row sync back shoulder period number, a field sync total row number, a field sync signal period number, a field sync front shoulder row number, and a field sync back shoulder row number;

the step of counting a pulse period of the target clock signal to obtain a counting result includes steps of:

setting the current row number to be 1;
setting the current row period number to be 1;
every time counting the pulse period of one target clock signal, adding 1 to the current row period number;
when the current row period number reaches the row sync total period number, adding 1 to the current row number, and returning to the step of setting the current row period number to be 1;
when the current row number reaches the field sync total row number, returning to the step of setting the current row number to be 1.

In some embodiments, the step of generating a target timing signal according to the target timing parameters and the counting result includes steps of:

when the current row period number reaches the row sync total period number, outputting the valid row sync signal until the current row period number reaches the row sync signal period number;

when the current row number reaches the field sync total row number, outputting the valid field sync signal until the current row period number reaches the field sync signal period number;

when the current row number reaches a sum of the field sync back shoulder row number and the field sync signal period number, starting an output stage until the current row number reaches a sum of the field sync signal period number, the field sync back shoulder row number and the field sync data valid row number; in the output stage, when the current row period number reaches a sum of the row sync signal period number and the row sync back shoulder period number, outputting a valid data enabling signal until the current row period number reaches a sum of the row sync signal period number, the row sync back shoulder period number and the data enabling period number.

In a second aspect, an embodiment of the present disclosure provides a video timing conversion device, including:

a timing analysis unit configured to analyze an original timing signal in a form of a differential signal of an original video, to obtain original timing parameters, wherein the original timing parameters include a data enabling period number, a field sync data valid row number and a refreshing frequency;

a parameter determination unit configured to determine target timing parameters and a target clock signal parameter according to a format of a target video and the original timing parameters. The target timing parameters include a data enabling period number, a field sync data valid row number and a refreshing frequency, which are the same as the data enabling period number, the field sync data valid row number and the refreshing frequency of the original timing parameters, respectively;

a timing generation unit configured to generate a target timing signal in the form of the differential signal of the target video according to the target timing parameters and the target clock signal parameter;

an input configured to receive the original timing signal;

an output configured to output the target timing signal.

In some embodiments, the video timing conversion device is a field programmable gate array.

In some embodiments, the video timing conversion device further includes: a clock management unit configured to generate a target clock signal according to the target clock signal parameter.

In a third aspect, an embodiment of the present disclosure provides a non-transitory computer-readable storage medium having computer-executable instructions stored thereon, wherein the instructions, when executed by a processor, perform the above-mentioned video timing conversion method.

DETAIL DESCRIPTION OF EMBODIMENTS

The embodiments of the present disclosure will be described more fully hereinafter with reference to the accompanying drawings, but the embodiments shown may be embodied in different forms and the present disclosure should not be construed as limited to the embodiments set forth herein. Rather, these embodiments are provided so that this disclosure will be thorough and complete, and will fully convey the scope of the present disclosure to one of ordinary skill in the art.

Embodiments of the present disclosure may be described with reference to a plan view and/or a cross-sectional view by way of idealized schematic diagrams of the present disclosure. Accordingly, the example illustrations may be modified in accordance with manufacturing techniques and/or tolerances.

Embodiments of the present disclosure and features of the embodiments may be combined with each other without conflict.

Terms used in the present disclosure are for the purpose of describing particular embodiments only and are not intended to limit the present disclosure. As used in this disclosure, a term "and/or" includes any and all combinations of one or more of associated listed items. As used in this disclosure, the singular forms "a", "an" and "the" are intended to include the plural forms as well, unless the context clearly indicates otherwise. The terms "including," "comprising," "made of . . . ," as used in this disclosure, specify the presence of features, integers, steps, operations, elements, and/or components, but do not preclude the presence or addition of one or more other features, integers, steps, operations, elements, components, and/or a group thereof.

Unless otherwise defined, all terms (including technical and scientific terms) used in this disclosure have the same meaning as commonly understood by one of ordinary skill in the art. It will be further understood that terms, such as those defined in common dictionaries, should be interpreted as having a meaning that is consistent with their meaning in the context of the relevant art and the present disclosure, and will not be interpreted in an idealized or overly formal sense, unless expressly so defined herein.

The embodiment of the present disclosure is not limited to the embodiments shown in the drawings, but includes modifications of configurations formed based on a manufacturing process. Thus, regions illustrated in the drawings have schematic properties, and shapes of the regions shown in the drawings illustrate specific shapes of regions of elements, but are not intended to be limiting.

In some related art, a video is displayed "frame by frame". That is, the video is composed of multiple frames of pictures, and each frame of picture is composed of multiple pixels (or sub-pixels), each of which constitutes a "dot" in the picture.

To display one frame of picture, it is necessary to write image data (DATA) into corresponding pixels, so that all pixels display corresponding contents. Typically, each frame is scanned "row by row". That is, the image data is written to each pixel in a first row, then to each pixel in a second row, and so on.

The above display process is controlled by a timing signal of the video.

Videos in different formats (i.e., videos having different standards) typically have timing signals in different formats, e.g., VESA, BT709, BT1120, EIA-CEA816, etc. The format of the timing signal that may be processed by each display panel at the same time is usually unchanged, so that when the format of the timing signal that may be processed does not match a format of the timing signal of a source video (original video), the display is affected.

Therefore, how to convert the format of the video timing signal becomes an urgent problem to be solved.

In a first aspect, an embodiment of the present disclosure provides a video timing conversion method.

The above method is used to convert a timing signal of an original video (original timing signal) into a timing signal of a video in a required format (target timing signal).

Figure 1:
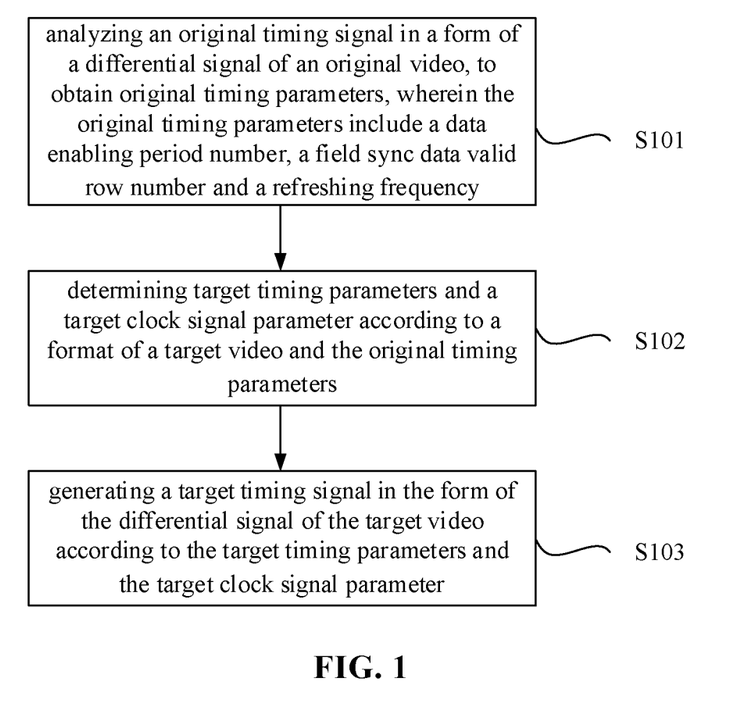
FIG. 1 is a flowchart of a video timing conversion method according to an embodiment of the present disclosure.

FIG. 1 is a flowchart of a video timing conversion method according to an embodiment of the present disclosure. Referring to FIG. 1, the video timing conversion method according to an embodiment of the present disclosure includes the following steps:

S101, analyzing an original timing signal in a form of a differential signal of an original video, to obtain original timing parameters, wherein the original timing parameters include a data enabling period number, a field sync data valid row number and a refreshing frequency.

The original timing signal in the source video (original video) is analyzed to obtain some original timing parameters of the original timing signal, i.e., the data enabling period number, the field sync data valid row number and the refreshing frequency. The original timing signal is in the form of the differential signal.

The "data enabling period number (HAC)" indicates the number of periods (pulse periods of a clock signal, the same below) during which the image data (DATA) is written in scanning of one row, and is in units of/row. Thus, the data enabling period number (HAC) is actually equal to the number of pixels to be displayed in each row. That is, one pixel is displayed per period.

Here, "field sync data valid row number (VAC)" indicates the total number of rows in which image data is actually written in one frame of picture, and thus, is actually equal to the number of rows to be displayed, and is in units of row/frame.

It may be seen that "data enabling period number afield sync data valid row number" (i.e., a product of the data enabling period number and the field sync data valid row number) is the total number of pixels to be displayed, i.e., "the number of dots" or "resolution" of each frame of picture.

Obviously, the "resolution" should correspond to the number of image data in the image signal of the video.

In the embodiments of the present disclosure, description is made with respect to transmission of image data (DATA) through single channel. In the case of a plurality of channels, the number of pixels is related to the number of channels.

Here, "refreshing frequency (FREQ)" indicates the number of frames (frame frequency) displayed in one second, and is in units of Hz (frame/second (s)), such as 120 Hz, 60 Hz, and the like.

S102, determining target timing parameters and a target clock signal parameter according to a format of a target video and the original timing parameters.

The target timing parameters include a data enabling period number, a field sync data valid row number and a refreshing frequency, which are the same as the data enabling period number, the field sync data valid row number and the refreshing frequency of the original timing parameters, respectively.

That is, according to the format of the required target video and the original timing parameters, some target timing parameters of the target timing signal and the target clock signal parameters (such as a frequency of the target clock signal) are determined. The data enabling period number (HAC), the field sync data valid row number (VAC), and the refreshing frequency (FREQ) included in the target timing parameters are unchanged with respect to the data enabling period number, the field sync data valid row number, and the refreshing frequency of the original timing parameters. That is, the resolution and the refreshing frequency are unchanged.

As mentioned before, the method of the embodiments of the present disclosure is used to convert the timing signals of the video without changing the content of the video, i.e., without changing the image data of the video. Therefore, the "number of frames (refreshing frequency)" of the target video and the "number of dots (resolution)" in each frame of picture should be the same as those of the original video, and thus the data enabling period number (HAC), the field sync data valid row number (VAC), and the refreshing frequency (FREQ) in the target timing parameters cannot be changed.

S103, generating a target timing signal in the form of the differential signal of the target video according to the target timing parameters and the target clock signal parameter.

That is, the target timing signal is actually generated according to the target timing parameters and the target clock signal parameter determined above, to complete the video timing conversion. The target timing signal is also in the form of the differential signal.

Therefore, in the method of the embodiment of the present disclosure, the resolution and the refreshing frequency of the original video may be determined by analyzing the original timing signal, and in a case where the resolution and the refreshing frequency are ensured to be not changed, the parameter (for example, the target clock signal parameter) of the target timing signal is determined according to the format of the target video, and then, the actual target timing signal is obtained according to the parameter of the target timing signal, thereby implementing real-time conversion of the video timing. When the video timing conversion method is applied to a receiving end of a display terminal, the display terminal may be adapted to various standard timings, improving the compatibility and the reliability of receiving video.

Figure 3:
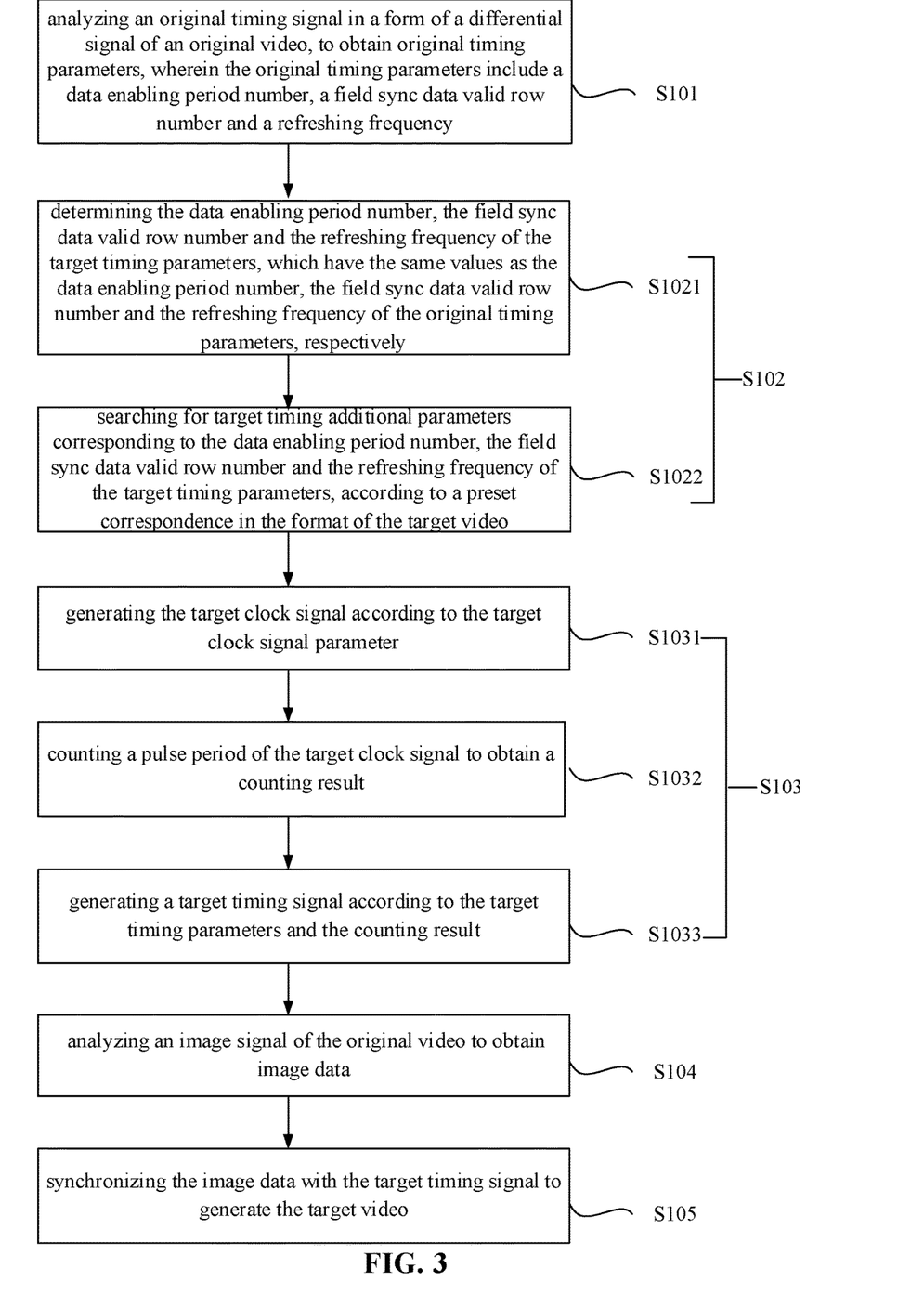
FIG. 3 is a flowchart of a video timing conversion method according to an embodiment of the present disclosure.

FIG. 3 is a flowchart of a video timing conversion method according to an embodiment of the present disclosure. In some embodiments, referring to FIG. 3, the step of determining target timing parameters according to a format of a target video and the original timing parameters (S102) includes following steps:

S1021, determining the data enabling period number, the field sync data valid row number and the refreshing frequency of the target timing parameters, which have the same values as the data enabling period number, the field sync data valid row number and the refreshing frequency of the original timing parameters, respectively.

S1022, searching for target timing additional parameters corresponding to the data enabling period number, the field sync data valid row number and the refreshing frequency of the target timing parameters, according to a preset correspondence in the format of the target video.

That is, in the process of determining the target timing parameters, the values of data enabling period number, the field sync data valid row number, and the refreshing frequency of the target timing parameters may be determined firstly, and these values are specifically determined to be the same as the corresponding values in the original timing parameters.

As before, the data enabling period number, the field sync data valid row number, and the refreshing frequency are determined. That is, the resolution and refreshing frequency of the video are determined. In each format of video, when the resolution and the refreshing frequency are determined, other parameters (target timing additional parameters) are also determined or format-specified.

Obviously, the format of the target video is known, and the resolution and the refreshing frequency (the data enabling period number, the field sync data valid row number, and the refreshing frequency) of the target video are also known, so that other parameters (that is, the target timing additional parameters) corresponding to the data enabling period number, the field sync data valid row number, and the refreshing frequency may be searched according to the preset correspondence in the format of the target video.

The correspondence may be in the form of a "correspondence table". For example, the target video of each format may have a correspondence table, and each row in the table includes a combination of the data enabling period number, the field sync data valid row number, and the refreshing frequency, and other parameters (target timing additional parameters) corresponding to the combination. Thus, the target timing additional parameters may be obtained by means of searching a table.

In some embodiments, the target timing additional parameters include: a row sync total period number (HTT), a row sync signal period number (HSW), a row sync front shoulder period number (HFP), a row sync back shoulder period number (HBP), a field sync total row number (VTT), a field sync signal period number (VSW), a field sync front shoulder row number (VFP), and a field sync back shoulder row number (VBP).

The above are specific items of the target timing additional parameters that may be found, and a specific meaning thereof will be described later.

In some embodiments, the step of determining a target clock signal parameter according to a format of a target video and the original timing parameters (S102) includes steps of:

determining a frequency of the target clock signal, which is equal to the row sync total period number (HTT)×the field sync total row number (VTT)×the refreshing frequency. That is, the frequency of the target clock signal is equal to the product of the row sync total period number (HTT), the field sync total row number (VTT), and the refreshing frequency.

When the target timing additional parameters include the above content, after the target timing additional parameters are obtained, the target clock signal parameter (specifically, the frequency of the target clock signal) may be calculated by using some target timing additional parameters according to the above formula.

In some embodiments, the original timing signal is in the form of a low voltage differential signal (LVDS); and the target timing signal is in the form of the low voltage differential signal.

In the embodiment of the present disclosure, the original timing signal and the target timing signal are not limited to be in the form of the low voltage differential signal (LVDS). In other embodiments of the present disclosure, the original timing signal and the target timing signal may also be in other forms.

In some embodiments, the original timing signals include an original row sync signal (HS), an original field sync signal (VS), and an original data enabling signal (DE); and the target timing signal includes a target row sync signal, a target field sync signal, and a target data enabling signal.

Specifically, the original timing signal and the target timing signal may be both in the low voltage differential signal (LVDS), i.e., multiple pulse level signals.

Figure 2:
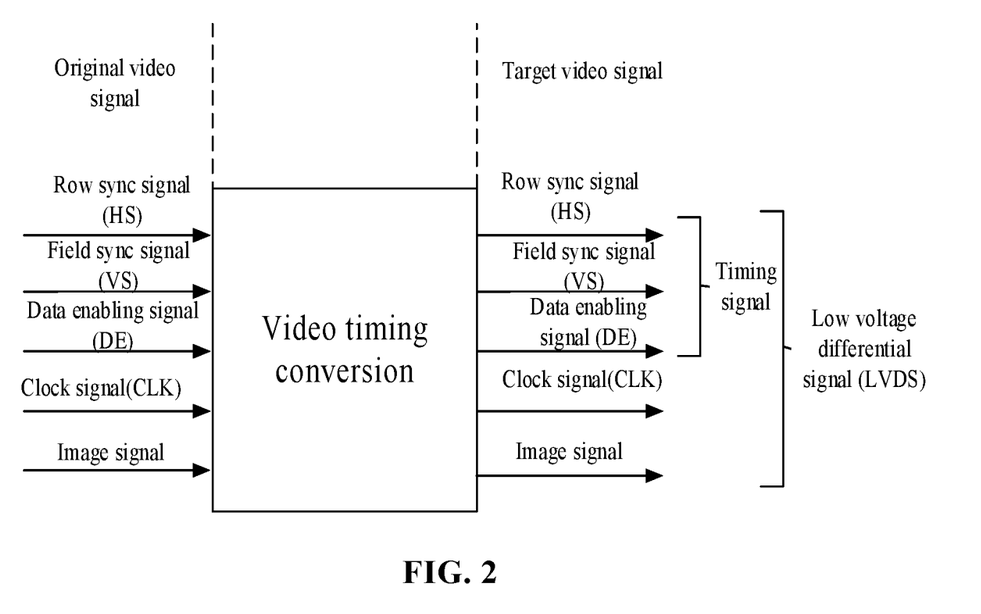
FIG. 2 is a schematic diagram of a signal flow in a video timing conversion method according to an embodiment of the present disclosure.

FIG. 2 is a schematic diagram of signal flow in a video timing conversion method according to an embodiment of the present disclosure. Referring to FIG. 2, the low voltage differential signal may specifically include three signals in parallel, i.e., a row sync signal, a field sync signal, and a data enabling signal.

The row sync signal (HS) is valid at the completion of scanning of each row and indicates the end of scanning of one row.

The field sync signal (VS) is valid at the completion of one frame and indicates the end of display of one frame of picture.

The data enabling signal (DE) is valid when image data is actually written during scanning of one row, and indicates that image data may be written at this time.

The above three signals are the core content of the timing signal in the form of the low voltage differential signal (LVDS).

Referring to FIG. 2, the signals of the original video may further include a clock signal (CLK) in the form of the low voltage differential signal. Also, the image signal may be in the form of the low voltage differential signal.

In some embodiments, referring to FIG. 3, the step of generating a target timing signal in the form of the differential signal of the target video according to the target timing parameters and the target clock signal parameter (S103) includes following steps:

S1031, generating the target clock signal according to the target clock signal parameter.

S1032, counting a pulse period of the target clock signal to obtain a counting result. S1033, generating a target timing signal according to the target timing parameters and the counting result.

To generate the final target timing signal, the target clock signal corresponding to the target timing signal may be generated, the pulse period of the target clock signal may be counted, and then the corresponding target timing signal may be generated according to the counting result, for example, the row sync signal (HS), the field sync signal (VS), and the data enabling signal (DE) may be generated.

In some embodiments, the target timing parameters further includes target timing additional parameters, the target timing additional parameters including: the row sync total period number (HTT), the row sync signal period number (HSW), the row sync front shoulder period number (HFP), the row sync back shoulder period number (HBP), the field sync total row number (VTT), the field sync signal period number (VSW), the field sync front shoulder row number (VFP), and the field sync back shoulder row number (VBP).

In some embodiments, step S1032 refers to counting the data enabling period number (HAC), the field sync data valid row number (VAC), and the above timing additional parameters, to obtain respective counting results (i.e., the number of pulse periods (period number) of respective target clock signals, as described below with reference to FIG. 4).

In some embodiments, step S1033 refers to generating the target timing signal according to the refreshing frequency (FREQ) in the target timing parameters and the counting results of the above parameters (i.e. the number of pulse periods (period number) of respective target clock signals).

That is, in addition to the above constant data enabling period number (HAC), the field sync data valid row number (VAC), and the refreshing frequency (FREQ), the target timing parameters to be determined (e.g., by searching a table) may also include the above target timing additional parameters.

For example, for a video of the HDMI format with a resolution of 1920×1080 and a refreshing frequency of 60 Hz, a specified row sync total period number (HTT) is 2200, and a specified field sync total row number (VTT) is 1125, and thus, the frequency of the target clock signal is the row sync total period number (HTT)×the field sync total row number (VTT)×the refreshing frequency=2200×1125×60=148.5 MHz.

Figure 4:
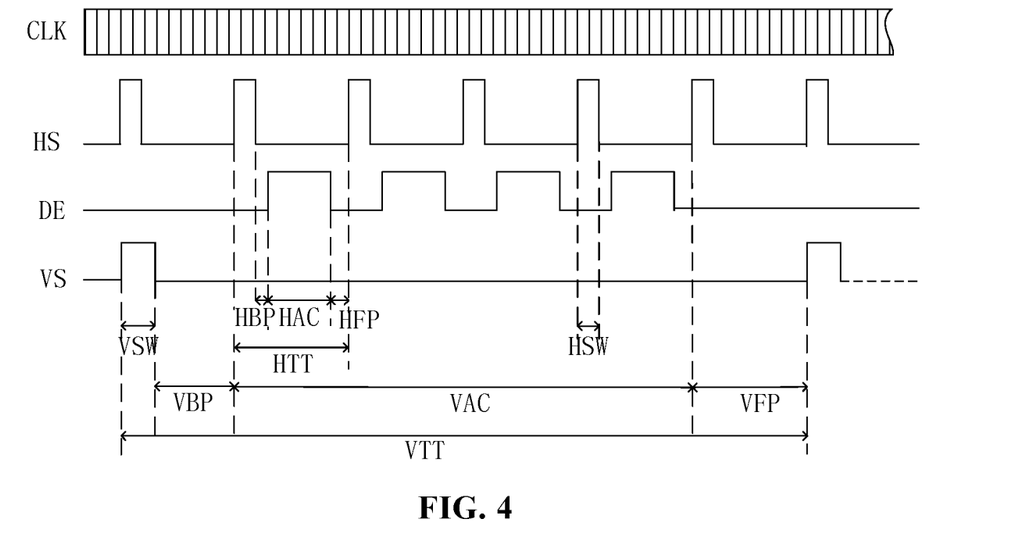
FIG. 4 is a timing diagram of some signals in a video timing conversion method according to an embodiment of the present disclosure.

FIG. 4 is a timing diagram of some signals in a video timing conversion method according to an embodiment of the present disclosure. Referring to FIG. 4, the above parameters have the following meanings (in the figure, a high level is a valid value, and a low level is an invalid value):

The row sync total period number (HTT), also called row sync total time, represents the total number of periods for which scanning of one row lasts, or the total time for which one row is scanned. Referring to FIG. 4, specifically, the row sync total period number (HTT) is a portion between two adjacent row sync signals (HS).

The row sync signal period number (HSW), also called row sync signal pulse width time, represents the number of periods or time for which a valid value of each row sync signal (HS) lasts.

The row sync front shoulder period number (HFP), also called row sync front shoulder time, indicates the number of periods before actually writing image data in scanning of one row, or "set-up time" before writing image data in scanning of each row. Referring to FIG. 4, specifically, the row sync front shoulder period number is a portion between the data enabling signal (DE) and the last row sync signal (HS) before the data enabling signal (DE).

The row sync back shoulder period number (HBP), also called row sync back shoulder time, indicates the number of periods after actually image data has been written in scanning of one row, or "waiting time" after image data has been written in each row of scanning. Referring to FIG. 4, specifically, the row sync back shoulder period number (HBP) is a portion between the data enabling signal (DE) and the first row sync signal (HS) after the data enabling signal (DE).

It should be understood that the above data enabling period number (HAC) represents the time spent to actually write image data in scanning of one row, thereby obtaining:

The row sync total period number (HTT) = the row sync signal period number (HSW) + the row sync back shoulder period number (HBP) + the data enabling period number (HAC) + the row sync front shoulder period number (HFP).

The field sync total row number (VTT), also called field sync total time, indicates the total number of rows scanned in a frame of picture, or the total time of a frame of picture. Referring to FIG. 4, specifically, the field sync total row number (VTT) is a portion between two adjacent field sync signals (VS).

The field sync signal period number (VSW), also called field sync signal pulse width time, indicates the number of periods during which a valid value of each field sync signal (VS) lasts.

The field sync front shoulder row number (VFP), also called field sync front shoulder time, indicates the number of rows scanned before a row (valid row) to which image data is actually written starts scanning in one frame of picture, or a "set-up time" before writing image data in one frame of picture. Referring to FIG. 4, specifically, the field sync front shoulder row number (VFP) is a portion between the field sync signal (VS) and the first row sync signal (HS) of a first row (valid row) to which image data is written and after the field sync signal (VS).

The field sync back shoulder row number (VBP), also called field sync back shoulder time, indicates the number of rows scanned after a row (valid row), to which image data is actually written, has been scanned in one frame of picture, or "waiting time" after image data has been written in one frame of picture. Referring to FIG. 4, specifically, the field sync back shoulder row number (VBP) is a portion between the field sync signal (VS) and the first row sync signal (HS) before the field sync signal (VS) and after the row sync signal (HS) of the last row (valid row) to which the image data is written.

It should be understood that the above field sync data valid row number (VAC) represents the valid row number in one frame of picture, thereby obtaining:

The field sync total row number (VTT) = the field sync signal period number (VSW) + the field sync back shoulder row number (VBP) + the field sync data valid row number (VAC) + the field sync front shoulder row number (VFP).

Thus, the above parameters are determined. That is, when the row sync signal (HS), the field sync signal (VS) and the data enabling signal (DE) should be valid, are determined, thereby obtaining the corresponding target timing signals.

It should be understood that the above description is made by taking the case where the row sync signal (HS) and the field sync signal (VS) represent the end of one row and one frame as an example, but the same applies to the actual process if the row sync signal (HS) and the field sync signal (VS) are considered to represent the beginning of one row and one frame.

It should be understood that the "target clock signal" is a periodic pulse signal, and the pulse period of the periodic pulse signal is the minimum calculation unit of the above target timing parameters.

Thus, it may be determined that the frequency FREQ (CLK-OUT) of the target clock signal satisfies the following equation:

$$FREQ(CLK\text{-}OUT) = \text{the row sync total period number } (HTT) \times \text{the field sync total row number } (VTT) \times \text{the refreshing frequency } (FREQ).$$

For example, for the video of the HDMI format having a resolution of 1920×1080 and a refreshing frequency of 60 Hz, the specific row sync total period number (HTT) is 2200, and the specific field sync total row number (VTT) is 1125. The frequency of the target clock signal may be obtained as follows:

$$FREQ(CLK\text{-}OUT) = 2200 \times 1125 \times 60 \text{ Hz} = 148.5 \text{ MHz}.$$

In some embodiments, the step of counting a pulse period of the target clock signal to obtain a counting result (S1032) includes following steps:

setting the current row number to be 1;

setting the current row period number to be 1;

every time counting the pulse period of one target clock signal, adding 1 to the current row period number;

when the current row period number reaches the row sync total period number, that is, when scanning one row has been done, adding 1 to the current row number, and returning to the step of setting the current row period number to be 1 to start scanning the next row;

when the current row number reaches the field sync total row number, that is, when one frame of picture has been displayed, returning to the step of setting the current row number to be 1 to start displaying the next frame of picture.

Figure 5:
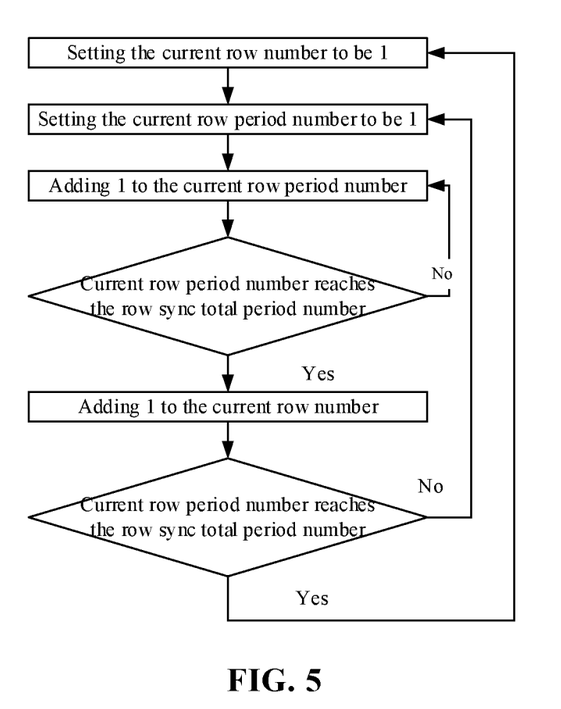
FIG. 5 is a schematic diagram illustrating a logic process of counting in a video timing conversion method according to an embodiment of the present disclosure.

FIG. 5 is a schematic diagram illustrating a logic process of counting in a video timing conversion method according to an embodiment of the present disclosure. Referring to FIG. 5, counting may be started from the 1st row and the 1st period, and every time the target clock signal completes one pulse period, the current row period number is added by 1, that is, the row scan is considered to have one more period.

When the current row period number reaches the row sync total period number (HTT), that is, when one row has been scanned, the current row number is added by 1, and the current row period number is recalculated from 1, that is, the current row is considered to be scanned, so the row number is added by 1, and the next row is rescanned from the first period.

In this way, as time advances, the current row period number changes periodically, and the current row number increases gradually until the current row number reaches the field sync total row number (VTT), which indicates that one frame of picture is completed, so that the current row number and the current row period number should both be set to 1, and be recounted from the 1st row and the 1st period (i.e., counting the next frame of picture).

It should be understood that in some cases (e.g., a user issues instructions, or an error occurs), the above counting process may also be "reset", i.e., the counting is forced to start from the 1st row and the 1st period.

In some embodiments, the step of generating a target timing signal according to the target timing parameters and the counting result (S1033) includes steps of:

First step: when the current row period number reaches the row sync total period number, outputting the valid row sync signal until the current row period number reaches the row sync signal period number.

Second step: when the current row number reaches the field sync total row number, outputting the valid field sync signal until the current row period number reaches the field sync signal period number.

Third step: when the current row number reaches a sum of the field sync back shoulder row number and the field sync signal period number, starting an output stage until the current row number reaches a sum of the field sync signal period number, the field sync back shoulder row number and the field sync data valid row number; in the output stage, when the current row period number reaches a sum of the row sync signal period number and the row sync back shoulder period number, outputting a valid data enabling signal until the current row period number reaches a sum of the row sync signal period number, the row sync back shoulder period number and the data enabling period number.

The current row period number and the current row number may be judged, respectively: when different conditions are met, the corresponding target timing signal is set to have a valid value; and when conditions are not met, the corresponding target timing signal has an invalid value.

Firstly, when the current row period number reaches the row sync total period number (HTT), that is, when one row is scanned, the row sync signal (HS) should output a valid value, and the valid value should last for a period which has the same number as the row sync signal period number (HSW), i.e. until the current row period number reaches (counted from 1) the row sync signal period number (HSW).

Secondly, when the current row number reaches the field sync total row number (VTT), that is, when one frame of picture is completed, the field sync signal (VS) should output a valid value, and the valid value should last for a period which has the same number as the field sync signal period number (VSW), i.e. until the current row period number reaches (counted from 1) the field sync signal period number (VSW).

Thirdly, the data enabling signal (DE) should have a valid value during the period in which the image data (DATA) is actually written into the valid row. That is, the data enabling signal (DE) should have a valid value when the following conditions are satisfied at the same time:

Condition 1, the field sync signal period number $(VSW)$ + the field sync back shoulder row number $(VBP)$ < the current row number < the field sync signal period number $(VSW)$ + the field sync back shoulder row number $(VBP)$ + the field sync data valid row number $(VAC)$.

Condition 2, the row sync signal period number $(HSW)$ + the row sync back shoulder period number $(HBP)$ < the current row period number < the row sync signal period number $(HSW)$ + the row sync back shoulder period number $(HBP)$ + the data enabling period number $(HAC)$.

Therefore, the valid value of each data enabling signal (DE) lasts for a period which has the same number as the data enabling period number (HAC); and the number of valid values of the data enabling signal (DE) is the field sync data valid row number (VAC) in each frame.

Therefore, the method only needs to simply count the pulse period of the target clock signal and output a specific signal when the counting result meets a specific condition. That is, it does not require a complicated operation, but only requires a small number of logical judgment operations.

Therefore, the method does not need to use a complex processing device such as a Central Processing Unit (CPU) and the like, but may be realized by a simple device such as a programmable gate array (FPGA) with small field internal capacity and the like, thereby reducing the design difficulty and the cost. The FPGA logic device is designed in a pipeline structure, meets the requirements of instantaneity and portability, and is suitable for any logic chip platform.

In some embodiments, referring to FIG. 3, the video timing conversion method according to the embodiment of the present disclosure further includes following steps:

S104, analyzing an image signal of the original video to obtain image data.

S105, synchronizing the image data with the target timing signal to generate the target video.

In the video timing conversion method of the embodiment of the present disclosure, the image signal of the original video may also be analyzed to obtain the image data corresponding to the picture to be displayed, and the image data is synchronized with the target timing signal (i.e., the image data is output according to the target timing signal), so as to obtain the complete target video that may be used for displaying.

The synchronization may be realized by a cache. That is, the image data of the image signal of the original video is stored in the cache in sequence according to the original timing signal; and the image data is read as the image signal of the target video from the cache at an appropriate time according to the target timing signal.

Specifically, the process of writing the image data into the cache may include: detecting the original timing signal of the original video; resetting the cache (i.e., clearing internally stored data) when the field sync signal (VS) of the original timing signal is valid; and receiving and writing the image data when the data enabling signal (DE) is valid.

Specifically, the process of reading the image data from the cache may include: detecting the target timing signal of the target video; and reading the image data from the cache when the data enabling signal (DE) is valid.

The actual device of the cache may be a DDR, FIFO, RAM, or other known memory devices.

Figure 6:
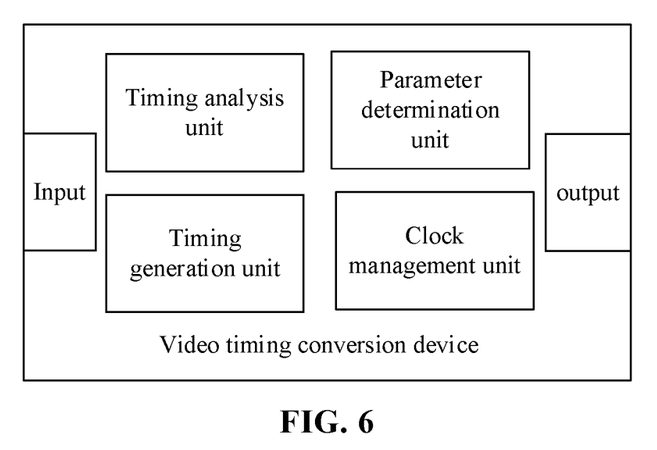
FIG. 6 is a block diagram illustrating a video timing conversion device according to an embodiment of the present disclosure.

FIG. 6 is a block diagram of a video timing conversion device according to an embodiment of the present disclosure. In a second aspect, referring to FIG. 6, an embodiment of the present disclosure further provides a video timing conversion device, including:

a timing analysis unit configured to analyze an original timing signal of an original video, to obtain original timing parameters, wherein the original timing parameters include a data enabling period number, a field sync data valid row number and a refreshing frequency;

a parameter determination unit configured to determine target timing parameters and a target clock signal parameter according to a format of a target video and the original timing parameters. The target timing parameters include a data enabling period number, a field sync data valid row number and a refreshing frequency, which are the same as the data enabling period number, the field sync data valid row number and the refreshing frequency of the original timing parameters, respectively;

a timing generation unit configured to generate a target timing signal of the target video according to the target timing parameters and the target clock signal parameter;

an input configured to receive the original timing signal; and an output configured to output the target timing signal.

The video timing conversion device of the embodiment of the present disclosure may realize the above video timing conversion method. The video timing conversion device includes an input (such as an interface of a certain format) for receiving the original timing signal (or the original video) and an output (such as a plug of a certain format) for outputting the target timing signal (or the target video). Thus, the video timing conversion device is a "converter" connected at the input of the display panel.

Referring to FIG. 6, in some embodiments, the video timing conversion device further includes:

a clock management unit configured to generate a target clock signal;

a timing generation unit configured to count a pulse period of the target clock signal to obtain a counting result; and generate a target timing signal according to the target timing parameters and the counting result.

When the target timing signal is required to be further obtained through the actual target clock signal, the target clock signal may be generated by providing a special clock management unit.

Specifically, the clock management unit may use a clock signal generated by a clock crystal oscillation source as an input clock signal (CLK-IN), perform frequency division and spread spectrum operations on the input clock signal using a Phase Locked Loop (PLL), and control the frequency division and spread spectrum operations with target timing parameters, to obtain the target clock signal.

In some embodiments, the video timing conversion device is a field programmable gate array.

As described above, the video timing conversion method according to the embodiment of the present disclosure may be implemented mainly by simple logic operation, and therefore, the actual device is preferably a programmable gate array (FPGA) with low cost, simple structure and convenient design.

Meanwhile, the programmable gate array usually includes the clock crystal oscillation source, so that the above target clock signal is also conveniently generated.

Figure 7:
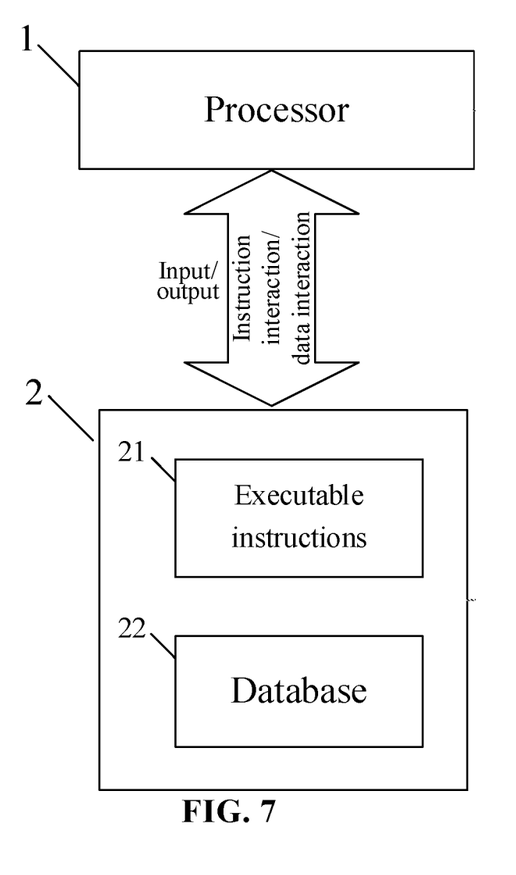
FIG. 7 is a schematic diagram of a structure of a video timing conversion device including a processor and a memory according to an embodiment of the present disclosure.

FIG. 7 is a schematic structural diagram of a video timing conversion device including a processor and a memory according to an embodiment of the present disclosure. In particular, as shown in FIG. 7, by taking the video timing conversion device including one processor 1 as an example, the memory 2 stores one or more executable instructions 21 therein, so that the processor 1 interacts instructions with the memory 2. The one or more executable instructions 21, when executed by the processor 1, cause the processor to implement any of the video timing conversion methods described above. The data involved in the method is stored in a database 22. In implementing the method, the processor 1 interacts data with the database 22 in the memory 2. The processor 1 calls the data in the memory 2 so that one or more executable instructions 21 are executed. Alternatively, the structure and the implementation process of the video timing conversion device are merely exemplary, and are not limited herein.

In a third aspect, an embodiment of the present disclosure provides a non-transitory computer-readable storage medium having computer-executable instructions stored thereon, wherein the instructions, when executed by a processor, perform the above video timing conversion method.

One of ordinary skill in the art will appreciate that all or some of the steps, systems, functional modules/units in the devices disclosed above may be implemented as software, firmware, hardware, and suitable combinations thereof.

In a hardware implementation, a division for functional modules/units mentioned in the above description does not necessarily correspond to a division for physical components. For example, one physical component may have multiple functions, or one function or step may be performed by several physical components in cooperation with each other.

Some or all of the physical components may be implemented as software executed by a processor, such as a central processing unit (CPU), digital signal processor, or microprocessor, or as hardware, or as an integrated circuit, such as an application specific integrated circuit. Such software may be distributed on a computer readable medium, which includes a computer storage medium (or a non-transitory medium) and a communication medium (or transitory medium). The term "computer storage medium" includes a volatile or nonvolatile, removable or non-removable medium implemented in any method or technology for storage of information such as computer readable instructions, data structures, program modules or other data, as is well known to one of ordinary skill in the art. Computer storage medium includes, but is not limited to, random access memory (RAM, more specifically, such as SDRAM, DDR, etc.), read only memory (ROM), electrically erasable programmable read only memory (EEPROM), FLASH or other disk storage; compact disk read only memory (CD-ROM), digital versatile disk (DVD), or other optical disk storage; magnetic cassettes, magnetic tape, magnetic disk storage or other magnetic storage; any other medium which may be used to store the desired information and which may be accessed by a computer. In addition, communication medium typically includes computer readable instructions, data structures, program modules or other data in a modulated data signal such as a carrier wave or other transport mechanism, and may include any information delivery medium as is well known to one of ordinary skill in the art.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by one of ordinary skill in the art that various changes in form and details may be made therein without departing from the scope of the present disclosure as set forth in the appended claims.

What is claimed is:

1. A video timing conversion method, comprising steps of:
   analyzing an original timing signal in a form of a differential signal of an original video, to obtain original timing parameters, wherein the original timing parameters comprise a data enabling period number, a field sync data valid row number and a refreshing frequency;
   determining target timing parameters and a target clock signal parameter according to a format of a target video and the original timing parameters; wherein the target timing parameters comprise a data enabling period number, a field sync data valid row number and a refreshing frequency, which are the same as the data enabling period number, the field sync data valid row number and the refreshing frequency of the original timing parameters, respectively; and
   generating a target timing signal in the form of the differential signal of the target video according to the target timing parameters and the target clock signal parameter.

2. The video timing conversion method of claim 1, further comprising steps of:
   analyzing an image signal of the original video to obtain image data; and
   synchronizing the image data with the target timing signal to generate the target video.

3. The video timing conversion method of claim 1, wherein the step of determining target timing parameters according to a format of a target video and the original timing parameters comprises steps of:
   determining the data enabling period number, the field sync data valid row number and the refreshing frequency of the target timing parameters, which have the same values as the data enabling period number, the field sync data valid row number and the refreshing frequency of the original timing parameters, respectively; and
   searching for target timing additional parameters corresponding to the data enabling period number, the field sync data valid row number and the refreshing frequency of the target timing parameters, according to a preset correspondence in the format of the target video.

4. The video timing conversion method of claim 3, wherein the target timing additional parameters comprises:
   a row sync total period number, a row sync signal period number, a row sync front shoulder period number, a row sync back shoulder period number, a field sync total row number, a field sync signal period number, a field sync front shoulder row number, and a field sync back shoulder row number.

5. The video timing conversion method of claim 4, wherein the step of determining a target clock signal parameter according to a format of a target video and the original timing parameters comprises:
   determining a frequency of the target clock signal, which is equal to the row sync total period number×the field sync total row number×the refreshing frequency.

6. The video timing conversion method of claim 1, wherein
   the original timing signal is in a form of a low voltage differential signal; and
   the target timing signal is in the form of the low voltage differential signal.

7. The video timing conversion method of claim 6, wherein
   the original timing signal comprises an original row sync signal, an original field sync signal, and an original data enabling signal; and
   the target timing signal comprises a target row sync signal, a target field sync signal, and a target data enabling signal.

8. The video timing conversion method of claim 7, wherein the step of generating a target timing signal in the form of the differential signal of the target video according to the target timing parameters and the target clock signal parameter comprises steps of:
  generating the target clock signal according to the target clock signal parameter;
  counting a pulse period of the target clock signal to obtain a counting result; and
  generating the target timing signal according to the target timing parameters and the counting result.

9. The video timing conversion method of claim 8, wherein the target timing parameters further comprises target timing additional parameters, the target timing additional parameters comprising: a row sync total period number, a row sync signal period number, a row sync front shoulder period number, a row sync back shoulder period number, a field sync total row number, a field sync signal period number, a field sync front shoulder row number, and a field sync back shoulder row number;
  the step of counting a pulse period of the target clock signal to obtain a counting result comprises steps of:
  setting a current row number to be 1;
  setting a current row period number to be 1;
  every time counting one pulse period of the target clock signal, adding 1 to the current row period number;
  when the current row period number reaches the row sync total period number, adding 1 to the current row number, and returning to the step of setting the current row period number to be 1;
  when the current row number reaches the field sync total row number, returning to the step of setting the current row number to be 1.

10. The video timing conversion method of claim 9, wherein the step of generating a target timing signal according to the target timing parameters and the counting result comprises steps of:
  when the current row period number reaches the row sync total period number, outputting a valid row sync signal until the current row period number reaches the row sync signal period number;
  when the current row number reaches the field sync total row number, outputting a valid field sync signal until the current row period number reaches the field sync signal period number;
  when the current row number reaches a sum of the field sync back shoulder row number and the field sync signal period number, starting an output stage until the current row number reaches a sum of the field sync signal period number, the field sync back shoulder row number and the field sync data valid row number; in the output stage, when the current row period number reaches a sum of the row sync signal period number and the row sync back shoulder period number, outputting a valid data enabling signal until the current row period number reaches a sum of the row sync signal period number, the row sync back shoulder period number and the data enabling period number.

11. A non-transitory computer-readable storage medium having stored thereon computer-executable instructions, wherein the instructions, when executed by a processor, perform the video timing conversion method of claim 1.

12. The non-transitory computer-readable storage medium of claim 11, wherein the video timing conversion method further comprises steps of:
  analyzing an image signal of the original video to obtain image data; and
  synchronizing the image data with the target timing signal to generate the target video.

13. The non-transitory computer-readable storage medium of claim 11, wherein the step of determining target timing parameters according to a format of a target video and the original timing parameters comprises steps of:
  determining the data enabling period number, the field sync data valid row number and the refreshing frequency of the target timing parameters, which have the same values as the data enabling period number, the field sync data valid row number and the refreshing frequency of the original timing parameters, respectively; and
  searching for target timing additional parameters corresponding to the data enabling period number, the field sync data valid row number and the refreshing frequency of the target timing parameters, according to a preset correspondence in the format of the target video.

14. The non-transitory computer-readable storage medium of claim 13, wherein the target timing additional parameters comprises:
  a row sync total period number, a row sync signal period number, a row sync front shoulder period number, a row sync back shoulder period number, a field sync total row number, a field sync signal period number, a field sync front shoulder row number, and a field sync back shoulder row number.

15. The non-transitory computer-readable storage medium of claim 14, wherein the step of determining a target clock signal parameter according to a format of a target video and the original timing parameters comprises:
  determining a frequency of the target clock signal, which is equal to the row sync total period number×the field sync total row number×the refreshing frequency.

16. The non-transitory computer-readable storage medium of claim 11, wherein
  the original timing signal is in a form of a low voltage differential signal; and
  the target timing signal is in the form of the low voltage differential signal.

17. The non-transitory computer-readable storage medium of claim 16, wherein
  the original timing signal comprises an original row sync signal, an original field sync signal, and an original data enabling signal; and
  the target timing signal comprises a target row sync signal, a target field sync signal, and a target data enabling signal.

18. A video timing conversion device, comprising:
  a timing analysis unit configured to analyze an original timing signal in a form of a differential signal of an original video, to obtain original timing parameters, wherein the original timing parameters comprise a data enabling period number, a field sync data valid row number and a refreshing frequency;
  a parameter determination unit configured to determine target timing parameters and a target clock signal parameter according to a format of a target video and the original timing parameters; wherein the target timing parameters comprise a data enabling period number, a field sync data valid row number and a refreshing frequency, which are the same as the data enabling period number, the field sync data valid row number and the refreshing frequency of the original timing parameters, respectively;
  a timing generation unit configured to generate a target timing signal in the form of the differential signal of the target video according to the target timing parameters and the target clock signal parameter;

an input configured to receive the original timing signal; and an output configured to output the target timing signal.

19. The video timing conversion device of claim 18, wherein the video timing conversion device is a field programmable gate array.

20. The video timing conversion device of claim 19, wherein the video timing conversion device further comprises: a clock management unit configured to generate a target clock signal according to the target clock signal parameter.

* * * * *